United States Patent [19]

Sattar

[11] Patent Number: 5,452,341
[45] Date of Patent: *Sep. 19, 1995

[54] INTEGRATED VOICE PROCESSING SYSTEM

[75] Inventor: Sohail Sattar, Irving, Tex.

[73] Assignee: Voiceplex Corporation, Irving, Tex.

[ * ] Notice: The portion of the term of this patent subsequent to Oct. 19, 2010 has been disclaimed.

[21] Appl. No.: 138,149

[22] Filed: Oct. 15, 1993

Related U.S. Application Data

[63] Continuation of Ser. No. 608,147, Nov. 1, 1990, Pat. No. 5,255,305.

[51] Int. Cl.⁶ .................. H04M 1/50; H04M 1/64
[52] U.S. Cl. ........................... 379/88; 379/201; 379/216
[58] Field of Search ............... 379/88, 67, 89, 97, 379/201, 216, 207, 214

[56] References Cited

U.S. PATENT DOCUMENTS

| | | | |
|---|---|---|---|
| 4,481,574 | 11/1984 | DeFino et al. | 364/200 |
| 4,489,438 | 12/1984 | Hughes | 379/88 |
| 4,585,906 | 4/1986 | Matthews et al. | 379/88 |
| 4,747,127 | 5/1988 | Hansen et al. | 379/94 |
| 4,748,656 | 5/1988 | Gibbs et al. | 379/93 |
| 4,755,932 | 7/1988 | Diedrich | 364/200 |
| 4,782,517 | 11/1988 | Bernardis et al. | 379/201 |
| 4,792,968 | 12/1988 | Katz | 379/92 |
| 4,811,381 | 3/1989 | Woo et al. | 379/67 |
| 4,850,012 | 7/1989 | Mehta et al. | 379/157 |
| 4,866,756 | 9/1989 | Crane et al. | 379/88 |
| 4,878,240 | 10/1989 | Lin et al. | 379/67 |
| 4,893,335 | 1/1990 | Fuller et al. | 379/200 |
| 4,922,520 | 5/1990 | Bernard et al. | 379/88 |
| 4,926,462 | 5/1990 | Ladd et al. | 379/67 |
| 4,930,150 | 5/1990 | Katz | 379/93 |
| 5,054,054 | 10/1991 | Pessia et al. | 379/89 |
| 5,133,004 | 7/1992 | Heileman, Jr. et al. | 379/67 |
| 5,136,631 | 8/1992 | Einhorn et al. | 379/67 |
| 5,243,643 | 9/1993 | Sattar et al. | 379/88 |
| 5,255,305 | 10/1993 | Sattar | 379/34 |

OTHER PUBLICATIONS

"Conversant 1 Voice System: Architecture and Applications", R. J. Perdue, et al., *AT&T Technical Journal*, vol. 5, No. 5, Sep./Oct. 1986, pp. 34–47.

"Voice Processing Update", *Teleconnect*, Sep. 1989, pp. 98–138.

*Primary Examiner*—Thomas W. Brown
*Attorney, Agent, or Firm*—Baker & Botts

[57] ABSTRACT

Integrated voice processing systems. General-purpose common computer platform voice processing systems described provide integrated voice processing functions, for example, voice messaging, call processing, interactive voice response and other systems typically only available in discrete systems. Industry standard computer databases and interfaces are used to create a dynamically modifiable voice processing system which is adaptable to perform to any customer specification. State vector architecture for the system described herein provide economic and efficient tailoring of voice processing functions for a wide variety of applications. Voice processing systems for interfacing voice transactions through a telecommunications line to a user comprise a general-purpose digital, computer common-platform adapted to communicate through the telecommunications line with an outside environment. A relational database interfaced to the general-purpose, digital computer for storing at least one object having a state that is modifiable by a vector protocol, thereby producing a voice transaction event that is output to the user through the telecommunications whereby the user activates the vector protocol through the telecommunications to act on the object and produce the voice transaction event, and an interface adapted to convert user commands input to the voice processing system through the telecommunications to activate the vector protocol and alter the object's state.

4 Claims, 6 Drawing Sheets

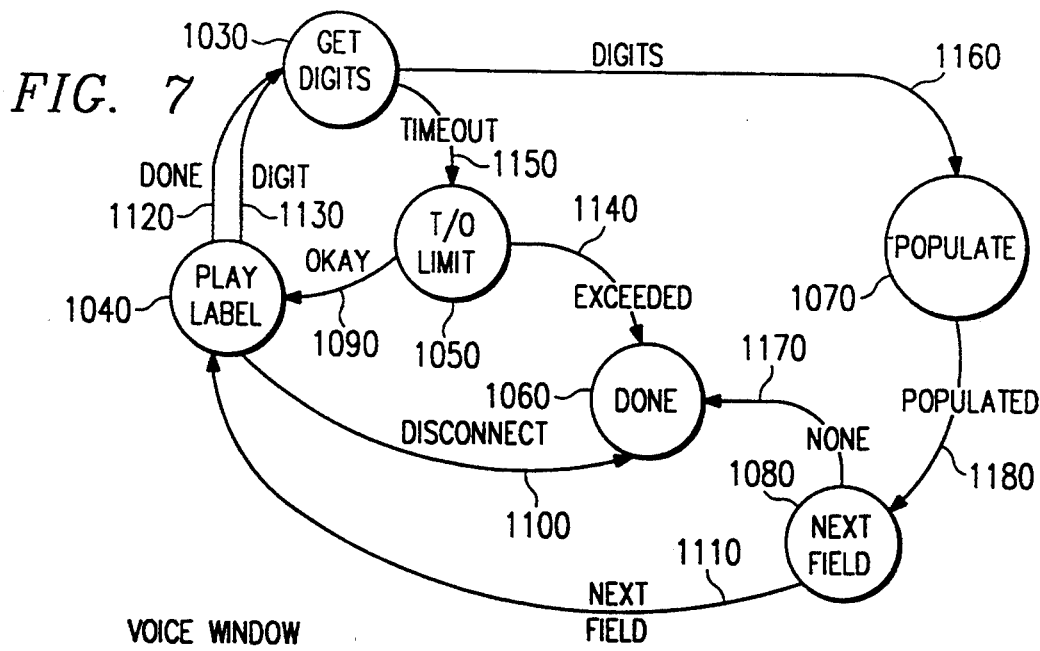

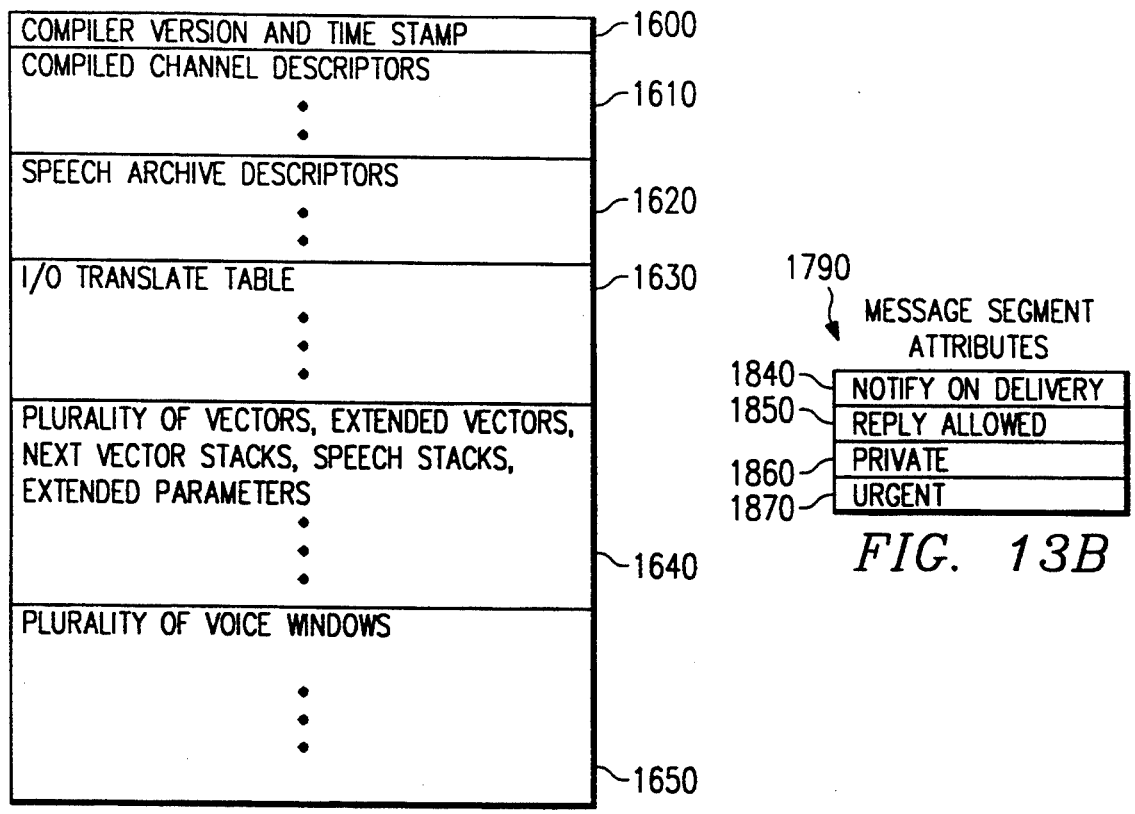
FIG. 11
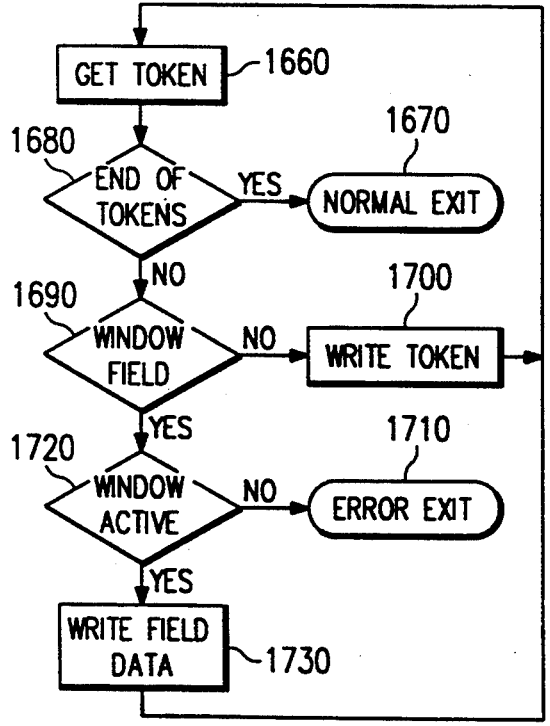
FIG. 12
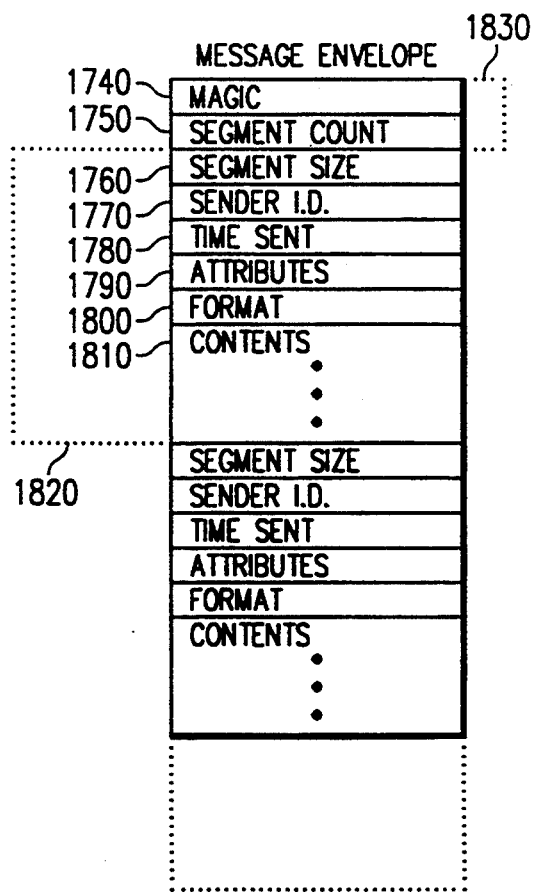
FIG. 13A
FIG. 13B

INTEGRATED VOICE PROCESSING SYSTEM

CROSS REFERENCE TO RELATED APPLICATIONS

This application is a continuation application of U.S. application Ser. No. 07/608,147, filed Nov. 1, 1990 and entitled "Integrated Voice Processing System", now U.S. Pat. No. 5,255,305, issued Oct. 19, 1993.

FIELD OF THE INVENTION

This invention relates to systems for voice processing and methods of providing voice processing functions over telecommunications lines. More specifically, this invention relates to systems and methods for performing integrated voice processing functions and transactions in a general-purpose computer, common-platform environment.

BACKGROUND OF THE INVENTION

Computer-based telecommunications systems have proliferated in the last few years along with the common proliferation of high-speed personal computers and the generally lower costs of equipment now available for use in complex telecommunications applications. With the use of high-speed telephone switching lines, telecommunications applications are exhibiting rapid advancements in technology and versatility. One of the areas in which telecommunications has experienced rapid advancements is the "voice processing" industry, wherein telephone lines provide communication links between users calling in to obtain information from a computer-based system that is adapted to provide information about a particular business or organization.

The voice processing industry provides "voice-based" systems which interact in varying degrees with users seeking information from the system. Voice-based systems have evolved over the last several years into discrete systems which accomplish specific tasks. Thus, the voice processing industry is broken up into a series of sub-industries, each filling niche technologies or "sub-technologies" which are occupied by particular providers and which are further segregated according to the products and services available in the specific sub-technology area. Generally, the voice processing industry has developed the following sub-technology areas: voice messaging ("VM") technology, call processing ("CP") technology, interactive voice response ("IVR") technology, and a number of other limited technologies which at the present are not large and do not command significant market shares, such as for example, the "FAX voice response" technology area. VM systems automatically answer calls and act as "automated attendants" to direct the calls to the proper person or department in an organization. These systems have in the past usually comprised look-up databases that perform voice functions for the user as the user accesses the system. VM technology can be adapted to read electronic mail to a user or caller on a telephone, and may also provide means for storing incoming facsimile messages for forwarding these messages over TOUCHTONE telephones when so instructed. Systems that fall under the VM category may also be adapted to recognize spoken phrases and convert them into system usable data.

Previous VM systems are exemplified in U.S. Pat. No. 4,585,906, Matthews et al. The Matthews et al. patent discloses an electronic voice messaging system which is connected with a user's telephone communications network or private branch exchange (PBX) to provide VM functions for the user. See Matthews et al., col. 4, lines 49–66.

Another example of a VM system is disclosed in U.S. Pat. No. 4,926,462, Ladd et al. The device of the Ladd et al. patent provides methods of handling calls in a VM system based on information supplied by a PBX. See Ladd et al., col. 4, lines 50–52. VM systems taught in the Ladd et al. patent comprise a feature phone emulator interface which emulates known PBX compatible feature phones having multiple line capability. The feature phone emulator is interfaced to the PBX as an actual feature phone, and the PBX is configured to assign a group of extension numbers to line appearances on the feature phone. The VM systems disclosed in the Ladd et al. patent answer the calls to these extensions by using the feature phone emulator interface. See Ladd et al., col. 4, lines 53–65.

Yet another VM system is disclosed in U.S. Pat. No. 4,811,381, Woo et al. The Woo et al. patent discloses a VM system which is connected to a trunk side of a PBX in a business telephone system. The VM system described in Woo et al. provides the feature of answering forwarded calls with a personal greeting from the party whose phone is accessed by a user. See Woo et al., col. 2, lines 37 through col. 2, lines 40–54.

If on the other hand a customer requires a voice processing system to perform on-line transaction processing and interact with a caller to answer routine questions about the status of an account, for example, the customer's requirements are usually best addressed by an IVR system which can be viewed as fulfilling requirements presented by a totally different set of architectural problems. Essentially, in an IVR system the user desires to talk to a central processing unit (CPU) to obtain database information. IVRs are particular useful in the banking industry wherein account holders can call a CPU to get account balances and other relevant information. Generally, IVR systems must also interface to a TOUCHTONE telephone to allow the caller to provide meaningful data to the IVR system which then can return meaningful information to the user.

When a retail company wishes to sell large volumes of merchandise through a "call-in ordering" system, it requires a call processing (CP) system. In the past, before CP systems were available, such retail companies utilized "agents" to handle incoming calls. The agents typically manned a switchboard that allowed manual input of user orders to an ordering system which could have been computer-based. CP technology today provides automatic call distribution (ACD) which allows a company to nearly eliminate the need for live agents handling phone calls, and replaces the agents with an interactive telephone system through which products can be ordered. The products can be paid for by credit cards having credit card numbers which are input through a TOUCHTONE telephone to a computer ordering system for billing purposes.

Other examples of CP technology are taught in U.S. Pat. No. 4,850,012, Mehta et al. The Mehta et al. patent discloses a CP system for intercepting incoming calls to a key telephone system, and returning a message to a calling party. See Mehta et al., col. 2, lines 11–17. The Mehta et al. system further provides an intercom line for providing voice announcements or messages through the key telephone system to the called parties.

CP systems described in Mehta et al. comprise a call processor which intercepts telephone calls wherein an instructional message is returned to the calling party, thereby informing the calling party to select a party associated with the key telephone system by dialing a pseudo-extension number associated with each party. See Mehta et al., col. 2, lines 18–28.

Other technologies have been developed to provide the particular services and solutions to other niches and sub-technologies in the voice processing industry. Interactive FAX voice processing is a burgeoning sub-technology area and has required specialized technical advancements to provide efficient voice-activated FAX systems. The technical advancements required to make FAX voice processing and other advanced voice processing systems feasible have not heretofore been adequately developed. There is a long-felt need in the art for a general-purpose system which can effectively, economically, and efficiently provide these technological advancements and which will integrate the above-mentioned other voice-based technologies in the voice processing field.

Examples of such systems for data reception and projection over telephone lines are disclosed in U.S. Pat. Nos. 4,481,574, DeFino et al., and 4,489,438, Hughes. Both the DeFino et al. and Hughes patents teach hard-wired systems which interface to telephone lines and computers to provide telecommunications applications. However, the systems disclosed in the DeFino and Hughes et al. patents generally perform the telecommunications transactions in hardware, thus requiring expensive and bulky equipment to accomplish these applications.

All of the above-referenced patents disclose voice-based systems which are discrete and which perform narrow, limited voice-based transactions. If a customer needs a voice messaging system, a device such as that disclosed, for example, in the Matthews et al. patent could be purchased. However, if the customer also needs a system to interact with callers and to answer routine questions about the status of, for example, their bank accounts, a separate IVR system would be necessary. Similarly, if a customer needs to perform retail ordering and accounts management, a separate CP system such as that disclosed in the Mehta et al. patent must be purchased. Thus, it can be seen that the problem facing a customer who requires multiple voice processing functions is that of the proliferation of a multitude of special purpose systems that are expensive to purchase and to maintain, and which potentially process telephone calls in separate and disjoint manners.

An illustrative example will provide to those with skill in the art an appreciation of the magnitude of this problem. Consider a bank that allows its users to inquire about the balance of their accounts using an IVR system, but must now transfer a call to a VM system if the caller wishes to leave a message for an officer of the bank that could not be reached. This creates several problems for both the bank and the user. First, the bank must purchase and maintain at least two voice processing systems, an IVR system and a VM system. Second, the user must wait while one system addresses the other system to provide the new voice processing function. Third, the bank has no way of getting a consolidated report of the handling of a given call from start to finish. Fourth, if the user decides that since the bank officer is not available and the IVR system can provide additional information to answer a particular question, the transfer back to the IVR takes a considerable amount of time and is complicated since the user must usually enter the entire identification password information again, thereby leaving the bank without any way to trace a particular call as it is routed from one discrete voice processing system to the other.

As more discrete voice processing systems proliferate in a single environment, the problem of multiple disjoint systems becomes even more complex. There is a long-felt need in the art for methods and systems which integrate the various disparate voice processing functions to provide a voice processing system which effectively and economically provides all of the desired voice processing functions for a customer. This need has not been fulfilled by any of the prior voice processing systems heretofore discussed, which only focus narrowly on one particular sub-technology in the complex and ever-growing array of voice processing sub-technologies.

A proposed solution to solve this long-felt need has been to connect a VM and IVR system together through a signalling link that coordinates the two systems. This link allows the systems to exchange calls with proper information relating to each call and which generates consolidated reports. However, the customer must still purchase discrete systems, and this solution is akin to suggesting that the customer purchase a personal computer with a word processing package of choice, another personal computer with, for example, a spreadsheet program, and yet another personal computer with a graphics program. Clearly, this is a cost prohibitive and ineffective way of performing a plurality of voice processing tasks and is not acceptable in light of the realities of today's business markets.

Another proposed solution to the integration problem has been to package two or more discrete systems in a larger cabinet. Usually, systems having a large cabinet have nothing in common except the cabinet itself. The systems may have their own separate consoles and keyboards, or they may have an A/B switch to share a single console yet still retain their individual keyboards. In all such "cabinet" systems, there is coexistence of applications but not integration of applications. Furthermore, systems which provide coexistence of applications usually provide hard-coded software in C-language, while the rest of the application development environment consists of C-language functions and programmer documentation that can only be understood by an expert programmer, but not by a customer who may require versatility and ease of use. Thus, the aforementioned integration attempts do not solve the long-felt need in the art for a truly integrated voice processing system.

Yet another attempted solution to the integration challenge has been to use a fixed VM system or a fixed IVR system and modify the resultant composite system to provide VM and IVR functions for execution in tandem on a common computer. The results of such machinations have been mixed, and the customer generally ends up with an inflexible VM or IVR system wherein the limitations and problems of one half of the system dictate the abilities and utility of the other half.

Examples of attempts at integration can be found in U.S. Pat. No. 4,792,968 to Katz. The Katz patent discloses a system of analysis selection and data processing for operation and cooperation with a public communication facility, for example a telephone system. See Katz, col. 1, lines 57–60. The systems disclosed in Katz provide methods of selecting digital data to develop records for further processing and allowing a caller to interface directly with an operator. See Katz, col. 1, lines 62–68. Another example of an attempt at integration may be found in U.S. Pat. No. 4,748,656 to Gibbs et al. The Gibbs et al. patent discloses an interface arrangement implemented on a personal computer to provide business communication services. See Gibbs et al., col. 2, lines 8–12. The personal computer interprets appropriate control signals which are then forwarded under control resident software to activate a telephone station set and provide communication services. See Gibbs et al., col. 2, lines 18–28.

Another integration attempt is disclosed in U.S. Pat. No. 4,893,335 to Fuller et al., which teaches a telephone control system that produces control signals which are programmable to provide a variety of control functions to a remote user, including for example, conferencing and transferring functions. See Fuller, et al., col. 2, lines 7–44. However in all of the above-referenced attempts at integration, only limited applications are achievable and significant problems of interfacing the different voice transactions are encountered. These aforementioned attempts at integration simply do not provide high level and effective voice transactions.

The inventor of the subject matter herein claimed and disclosed has also recognized another problem facing the task of integrating VM with IVR and other voice processing systems. Caller interfaces present a significant problem in integration since VM systems generally have fixed, hard-coded interfaces. In an integrated environment, this restricts the versatility of the entire integrated system, since it confines the system to the limitations of the original design of the VM interface. For example, if an IVR system provides voice responses to an airline for crew scheduling, it is unlikely that a IVR system could understand an employee number, translate it to an extension, look up the caller's supervisor and automatically transfer or drop the message in the supervisor's mailbox without querying the caller. The VM interface is usually inadequate to perform such complex tasking in an economical fashion. Thus, a fixed VM system quickly dominates the more flexible IVR system when the two systems attempt to operate together and the necessary VM caller interface is introduced in a pseudo-integrated environment. Such pseudo-integration schemes to put different voice processing applications together have heretofore simply not been able to accomplish the multifarious complex voice transactions required. Prior integrated systems do not solve the long-felt need in the art for a truly universal integrated voice processing telecommunications system.

During the evolution of the voice processing industry, VM systems have not been customized to perform according to a particular customer's unique specifications. Thus, VM-type systems were developed in mostly hard-coded traditional programming languages such as the C-language or Pascal language. In contrast, IVR systems were generally more sophisticated and employed primitive customization for particular applications. The IVR systems were thus generally designed in higher level programming language known as "scripted languages." Scripted languages merely replace the C-language or Pascal knowledge requirements of the system developer with that of the Basic language.

The common problem which emerges with the use of scripted languages is a disorientation of the system developer when designing the flow of the particular application. Furthermore, most scripted languages require several dozens of pages of basic code to accomplish even a simple programming task. Even though scripted programs can be interpreted by a programmer having less expertise than that which would be required if the software programs were written in the more traditional C-language or Pascal language, it will be recognized by those with skill in the art that after even a few pages of the lengthy scripted code have been reviewed, the entire flow of the application becomes disjoint and escapes the normal comprehension of even the most expert programmers in scripted languages.

In order to devise ways of alleviating the problems extant in scripted software voice processing systems, the concept of a state, event and action to define applications having programming methodologies in, for example, C-language or Pascal have been developed. Example of such systems are disclosed in U.S. Pat. No. 4,747,127 to Hansen et al. The Hansen et al. patent describes methods of implementing states, events, and actions to control a real-time telecommunications switching system. The methods of performing voice processing transactions in the Hansen et al. patent are accomplished using a scripted base language similar to the "SHELL" programming language used by the AT&T UNIX System V operating system. See Hansen et al., col. 7, lines 15–35.

The methods and systems described in the Hansen et al. patent are strictly limited to telecommunications switches on a PBX. While the implementation of states, events and actions to perform higher level voice transactions is desirable, the systems and methods disclosed in the Hansen et al. patent do not fulfill the long-felt need in the art for integrated voice processing systems adaptable to provide multiple functions in a single, general-purpose computer environment and for varying customized applications. Furthermore, the use of non-traditional script base high-order programming language severely limits the adaptability of systems taught in the Hansen et al. patent, and thus the systems and methods disclosed in the Hansen et al. patent cannot be manipulated to provide integrated voice processing transactions.

The aforementioned plethora of voice processing systems are generally restricted to discrete sub-technology areas and accomplish narrow tasks of specific voice transaction functions. The above systems are at best only partially adapted to be customized for particular user applications and are not practically integrated to provide multiple voice processing transactions in a common computer platform. The aforementioned long-felt needs in the art have therefore not been fulfilled by any of the voice processing systems and solutions which have been developed, and do not provide integration, adaptability, customization, and flexible architecture definition. The present invention solves these problems and fulfills these long-felt needs.

SUMMARY OF THE INVENTION

Satisfaction of the above-referenced long-felt needs in the art is accomplished by the present invention, which provides an application development environment that allows customization of integrated voice processing systems. Systems and methods provided in accordance with the present invention further allow voice processing application developers and engineers to quickly develop and layer multiple voice processing applications together as customer needs change, without confining these developers and engineers to the narrow and focused specifications of prior voice processing systems. Whether a VM, IVR, CP, FAX, or other type of voice processing system is desired by a customer, customized systems provided in accordance with the present invention provide a standard operating system realizable in a general-purpose computer common-platform, environment readily available in the art and easily recognizable to system users. Furthermore, utilization of commonplace operating systems and standard interfaces between databases and the general-purpose computer, common-platform provide the systems disclosed and claimed herein with versatility, flexibility and the ability to provide integrated voice processing transactions. Thus, systems provided in accordance with the present invention are easy to use since they are customized to the customer's unique specifications, and are economical since they reduce the need for specialized and redundant computer hardware.

In preferred embodiments, the voice processing system comprises a general-purpose digital computer, common-platform adapted to communicate through the telecommunications lines with an outside environment; a relational database interfaced to the general-purpose, digital computer for storing at least one object having a state that is modifiable by a vector protocol, thereby producing a voice transaction event that is output to the user through the telecommunications line, whereby the user activates the vector protocol through the telecommunications line to act on the object to produce the voice transaction event; and an interface adapted to convert user input commands to the voice processing system through the telecommunications line to activate the vector protocol and alter the object's state.

Methods provided in accordance with the present invention also solve a long-felt need in the art for adaptable, integrated voice processing systems which may be customized for a particular user's application or specification. With systems and methods provided in accordance with the present invention, any type of voice processing function commonly available today, or which will be necessary in the foreseeable future, can be integrated in a vectored-state architecture written in traditional C-code or other desirable programming language. Thus, methods and systems provided in accordance with the present invention allow for easy customization and adaptability of voice processing systems to provide a multitude of voice processing functions, and for trouble-shooting or modification of such systems.

Methods of performing voice processing functions in a voice processing system utilizing a digital input device and a telecommunications line are further provided in preferred embodiments. The methods preferably comprise the steps of receiving input from a user over the telecommunications line and storing the input in a digital format on a general-purpose computer-based control system, initializing a state vector function stored in a memory in the general-purpose computer with the digital input received from the user, operating the state vector function on a system-defined object having a state associated therewith stored on a database further associated with the general-purpose computer, thereby modifying the object's state, generating user-recognizable events which are realized by the state vector's operation on the object stored on the database, and outputting the user-recognizable events generated by the state vector's operation on the object in response to the change in the object's state.

The advantageous and beneficial results provided with systems and methods provided in accordance with the present invention satisfy long-felt needs in the art for integrated systems implemented on general-purpose computer common-platforms using standard operating systems and industry-recognized software interfaces. The unexpected and advantageous results achieved from creating customized voice processing systems which are adaptable to new voice processing applications, when confronted with particular customer demands, are extraordinary in light of the present state of the art. With prior voice processing systems occupying niche sub-technologies, the ability to accomplish new customer specified application demands is so limited as to be nearly nonexistent. Such demands will be increasingly made on the voice processing systems of the future because of the increased awareness of, and desire for, voice processing functions by business and other enterprises. Systems and methods provided in accordance with the present invention are designed to meet such demands.

BRIEF DESCRIPTION OF THE DRAWINGS

FIG. 7 is a state flow diagram of an exemplary voice window input vector provided in accordance with the present invention.

FIG. 8 is a block diagram of an exemplary voice window schema for a voice window vector.

FIG. 9A is a block diagram of an exemplary voice window field types for the voice window scheme of FIG. 8.

FIG. 9B is a block diagram, of exemplary voice window enunciation types for the voice window schema of FIG. 8.

FIG. 9C is a block diagram of available exemplary voice window field attributes for the voice window attributes for the window schema of FIG. 8.

FIG. 10 is a block diagram of an exemplary compiled vector element for the voice window schema of FIG. 8.

FIG. 11 is an exemplary compiled application logic state table for a voice processing system provided in accordance with the present invention.

FIG. 12 is a block diagram of a preferred method for creating dynamic SQL statements for voice windows.

FIG. 13A is a block diagram of an exemplary message envelope which integrates voice processing functions.

FIG. 13B is a block diagram of exemplary message segment attributes for the message envelope of FIG. 13A.

DETAILED DESCRIPTION OF PREFERRED EMBODIMENTS

Figure 1:
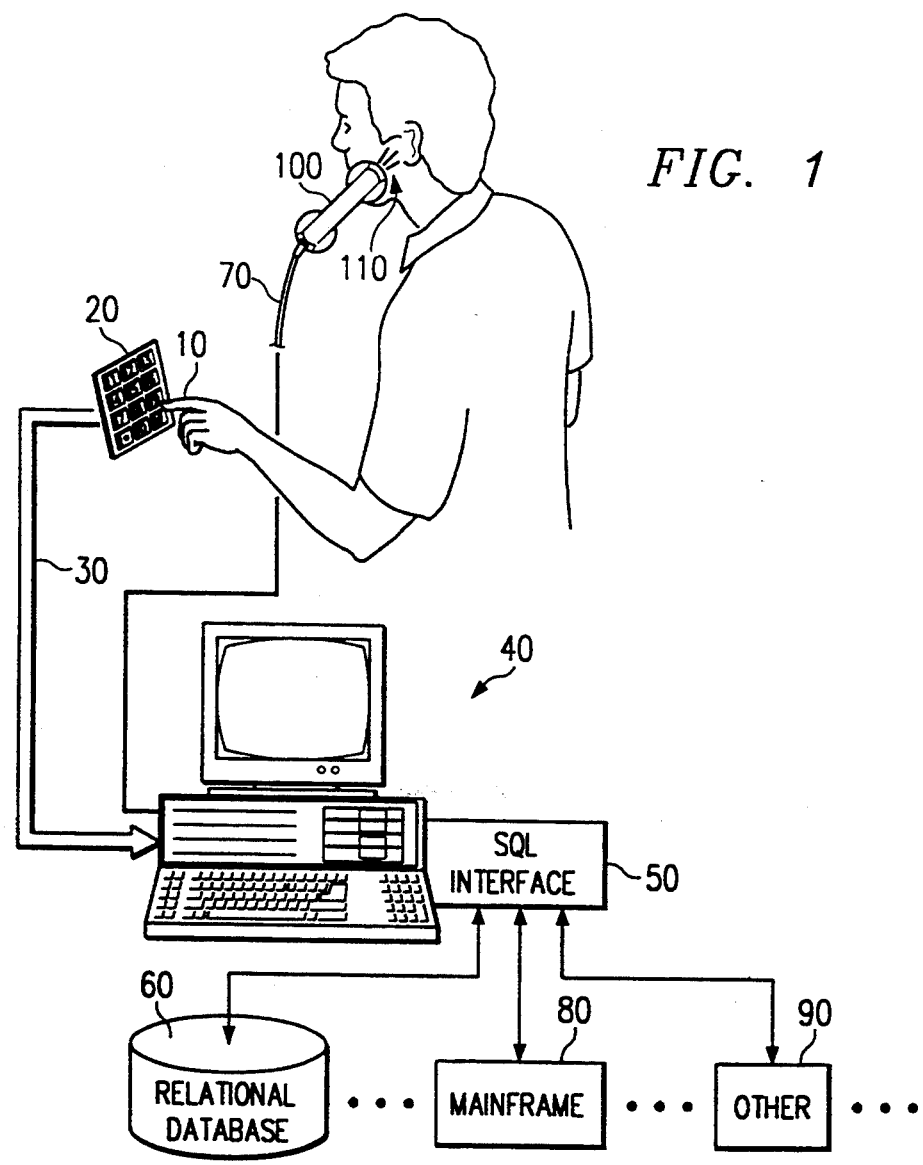
FIG. 1 is a block diagram of an integrated voice processing system provided in accordance with the present invention.

Referring now to the drawings wherein like reference numerals refer to like elements, a telecommunication& system provided in accordance with the present invention is illustrated. In preferred embodiments, the telecommunications system of FIG. 1 comprises a general-purpose computer common-platform which economically and efficiently integrates all of the sub-technology voice processing functions currently available, and others which it is contemplated will be developed in the future. In operation of the telecommunications system of FIG. 1, a user shown generally at 10 accesses a TOUCHTONE telephone 20, in preferred embodiments, to call a particular business or organization which utilizes telecommunications systems provided in accordance with the present invention. TOUCHTONE telephone 20 preferably digitally communicates over a telecommunication line shown schematically at 30 with a general-purpose digital computer 40 that provides the control and processing functions for the telecommunications system. The general-purpose, digital computer 40 is preferably adapted to communicate via telecommunications line 30 with the user 10 in the outside environment. The outside environment may generally comprise number of users who are attempting to access the telecommunications system simultaneously and receive information from it.

The general-purpose computer 40 preferably provides an interface, shown graphically at 50, which is adapted to convert commands from the user that are input through the telecommunications lines 30 into a recognizable "query" to the telecommunications system. The interface 50 allows recognition of the user commands which have been digitized, so that the particular software routines which run the voice processing transactions can be recognized by the telecommunications system.

The interface 50 preferably communicates with a relational database means 60 which further communicates through the interface to the general-purpose computer 40 and which stores at least one object which has a state that is modifiable by a vector protocol. When the vector protocol operates on the object, it produces a voice transaction "event" that can be output to the user 10 over telecommunications line 70. The telecommunications line 70 and telecommunications line 30 may in fact be one integral line, or can be separate lines as shown here. The user preferably activates the vector protocol, which is also stored on the relational database 60, through telecommunication line 30 to act on the object and produce the voice transaction event. Interface 50 translates the user command into a standard query which is recognizable by the operating system of the general-purpose computer 40 as it communicates with the relational database 60.

The relational database 60 stores the vectors, objects and events which are used to drive the telecommunications systems provided in accordance with the present invention. It will be recognized by those with skill in the art that relational database 60 may in fact be an integral part of computer 40, or may be stored in a separate digital computer that is connected through yet another communications line to computer 40. In this fashion, many digital computers 40 may actually have access to a single relational database 60 should the particular customer application require such an arrangement. Whether the relational database 60 is an integral part of general-purpose computer 40 or a separate database at a remote location, all such arrangements and equivalents thereof are contemplated to be within the scope of the present invention.

Furthermore, interface 50 may also communicate user queries to, for example, other mainframe computers 80, or yet other outside computer based hardware 90 that is adapted to understand the queries posed through interface 50 and further provides voice transaction events through telecommunications lines 70 after an object has had its state modified by a vector provided in accordance with the present invention.

In yet further preferred embodiments of telecommunications systems herein described, the user receives voice transaction events at a handset 100 which is actually part of the TOUCHTONE telephone 20. The voice transaction events which are output to the user, shown generally at 110 may, for example, prompt the user to activate yet another vector protocol in a telecommunications system stored on the database 60 or other computer equipment, or prompt the user to end his or her communications with the system.

One of the main features and advantages of the present invention resides in the fact that the application development environment and telecommunication system itself is realized in a general-purpose computer common-platform with industry standard architecture. This includes an industry standard operating system, industry standard database, and industry standard communications protocols. In further preferred embodiments, the general-purpose computer is an American Telephone & Telegraph (AT&T) 386-based personal computer utilizing the UNIX operating system. In still further preferred embodiments, interface 50 comprises the "standard query language" (SQL) interface which is an International Business Machine (IBM) standardized interface that is recognizable by a large number of databases and computer systems commonly available in the industry today.

The SQL interface converts the user's commands input over the telecommunication line to standard queries which can be communicated to the relational database 60, mainframe computer 80, or other computer hardware equipment 90 having vectors, objects and events stored thereon. In still further preferred embodiments, the relational database 60 provided in accordance with the present invention is also an industry standard database which communicates with general-purpose computer 40 through the SQL interface. The inventor of the subject matter herein claimed and disclosed has determined that the IBM SQL standard based INFORMIX database is a preferable database which can be accessed by the user and which stores the vector protocols, objects, and events used by the voice processing systems provided in accordance with the present invention. While other standard databases and interfaces may be utilized in voice processing systems having state vector architecture as described herein, the industry standard SQL interface and INFORMIX database have been determined to provide storage and acquisition systems which are widely used by all facets of the computer industry. Since these standard architecture systems are preferably utilized in accordance with the present invention, telecommunications systems described herein are easily modifiable and adaptable for virtually any customer application or to any particular specification of voice processing transactions known today or which will become known and desired by customers in the future.

Through the use of the SQL interface with standard TOUCHTONE telephones, telecommunications systems provided in accordance with the present invention interface to the INFORMIX database and various other computer hardware for sophisticated applications which are required by certain customers and which cannot be integrally provided by any other voice processing systems in the present sub-technology voice processing groups. Telecommunications systems described herein are thus completely configurable to any telecommunications network, and can be adapted to perform all of the various functions presently provided by the separate sub-technology groups. These advantageous results have not heretofore been achieved in the voice processing art and represent a significant long-term solution to the integration of voice processing functions which until now have functioned in discrete operating environments, thereby greatly increasing the costs to customers of operating with one or more of these different and discrete voice processing systems.

In accordance with the present invention, customer applications of telecommunications systems are developed by using programmed "objects," determining the state of the programmed object, performing an action on the object, determining a computer event caused by the application of the action onto the object, thereby producing a voice transaction, and disposing of the event so that the process may be repeated if so desired. The disposition of the event may cause another action on the same object or, in preferred embodiments, it may force a permanent or temporary change of reference to one or more objects.

Objects provided in accordance with the present invention are defined on a microscopic scale to perform single functions and for detailed operations. However, groups of objects provided herein by the integrated voice processing system of this invention may also be formed to facilitate operations on a higher level. To this end, objects may be as detailed as, for example, a spoken name contained in a VM application of a person sending a voice message, or as broad as an entire mailbox containing all voice messages, facsimiles, or electronic mail for an individual.

Similarly, actions may also be microscopically defined for a high degree of detail, while at the same time they may be grouped together in order to hide unnecessary detail from the user accessing the telecommunications system. A detailed action may, for example, play a spoken name from within a VM application, and another action may play, for example, the date and time that the message was sent, while yet another action plays only a particular desired segment of the message. Detailed actions may also be combined into a group of actions which are accessed on the relational database by a single reference commanding a voice message envelope to play the entire contents in a manner determined by arrangement of the detailed actions within the group. All such applications of objects, actions and events are encompassed within the scope of the present invention.

In still further preferred embodiments, multiple objects, actions, events, and event disposition instructions may be combined together to form an "Application State Logic Table" (AST). An AST implements all functions and features of a VM system and comprises detailed individual objects and actions as well as potentially several smaller groups of objects and actions. However in accordance with the present invention, the AST may be treated as another single object, thereby allowing flexibility of integrating multiple applications.

The actions, events, and objects described herein are adaptable and designed to process any application in the voice processing universe. In accordance with the present invention, processing a voice transaction is facilitated through the use of "vector" protocols. In reality, vectors are software programs which perform the various functions that a customer desires for a particular voice processing system. Since each telecommunication system described herein is an object-oriented, event-based system adaptable to perform any of the functions presently available in the voice processing rubric, each system is "vector customized" depending upon the particular voice processing features which a customer may desire for its system. Preferably, the vectors are programmed in C-language but application developers may merely use them by reference and need not concern themselves with the details of the C-language code, thereby allowing application developers not fluent in scripted computer languages to develop applications quickly and to provide layered multiple applications as the particular needs change without having to be confined by the specifications of an earlier application.

Figure 2A:
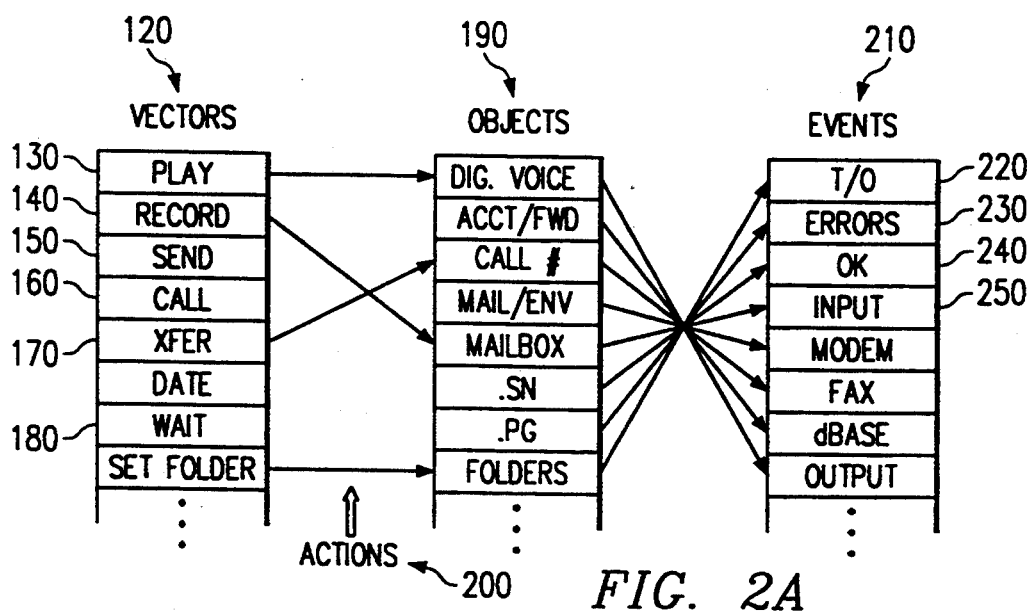
FIG. 2A is a block diagram of the interaction between vectors, objects, and events provided in accordance with the present invention.

Since the vectors are not "hard-wired" and are adaptable through changes in the C-code, telecommunications systems provided in accordance with the present invention completely encompass all types of voice processing applications. Referring to FIG. 2A, an illustration of the interaction of the vectors, objects, and events is illustrated. The vectors 120 are stored on the computer in the INFORMIX database. In order to facilitate speed and ease of operation, the AST comprising a plurality of vector references and arrangments is compiled rather than used in source code form. Many different kinds of vectors are available and can be accessed by the user. The vectors 120 thus generally comprise a number of routines such as, for example, "play a message" 130, "record a message" 140, "dual tone multifrequency input" (DTMF) 150, "call back" 160, "transfer" (XFER) 170, and any other vectors which are particularly desired to implement a particular customer demanded voice processing function.

The above-referenced vector protocols provide many different kinds of voice transactions which heretofore have only been available in separate discrete voice processing systems from the different sub-technology areas. For example, the "play a message" vector 130 and "record a message" vector 140 are generally recognizable as VM functions. However, the send host message vector 150 and the wait host response vector 180 are generally recognizable as providing IVR-type functions. Similarly, the XFER vector 160 is, for example, recognized as a CP function. Thus, by using "soft-wired," that is, software programmable vectors which are easily modifiable and adaptable in the C-language, many different kinds of voice processing functions are available on a single telecommunications system provided in accordance with the present invention. Thus, a customer need not purchase many different types of voice processing systems, and the resulting customized vector-oriented systems described herein are generally two to two-and-a-half times less expensive than hybrid, pseudo-integrated voice processing systems which have been used before. This presents significant cost savings to the customer and evinces the great advantages inherent with the telecommunication systems provided in accordance with the present invention.

In further preferred embodiments, the vectors 120 operate on a number of system-defined objects 190. The objects 190 are preferably also stored on the INFORMIX database which may be an integral part of the general-purpose computer or may be found at a location remote from the computer. The objects may also be stored in other mainframe computers or computer hardware devices when a particular object must perform a function associated with these other remote systems. The objects have "states" associated therewith which correspond to a particular place that the object is in time, after having been operated on by a vector protocol, or which may be an existing initial state before such operation. Depending upon the extent and sophistication of the telecommunications system wherein a number of users might have simultaneous access to the system causing vectors to operate on the objects, a multitude of states may exist for the object at any one time in light of the voice transaction event produced by the object that will be output to the particular users.

The vectors 120 operate on the objects 190 to change the objects' states in response to users' queries to the system. In further preferred embodiments, the telecommunications system is adapted to keep track of all of the state operations performed on the objects in time so that the particular states of each of the objects are always available to the system. The vectors 120 change the state of the objects by performing actions 200 on the objects defined by the vectors. Vectors may ask, for example, to call a digitized voice for a VM function, an account password for an IVR voice transaction, or to call a number of software attendants in a CP system. Each time the vectors 120 act on the objects 190, the objects' states are changed, thereby producing events 210. The events 210 are output to the user in a recognizable fashion so that the user can make a decision concerning which way to proceed as it accesses the telecommunications system.

Many types of voice processing transactions or events are available to provide voice processing functions. For example, a "time-out" (T/O) event 220 holds the system in a particular mode for a predetermined amount of time. Additionally, "error" events 230 and "OK" events 240 are available to the system, events which require additional user "input" 250 may be implemented in the system, as well as other events which provide sophistication and more involved user interaction with the system. The events preferably produce user-recognizable output, or promptings to the vector protocols in an AST environment, to produce new object states and further events which may finally be output to the user. Any voice processing functions which have been implemented in the past on discrete systems are thus programmable in a telecommunications system provided in accordance with the present, and the events so produced are stored on a database to be available to a user when the user accesses a particular system.

Figure 2B:
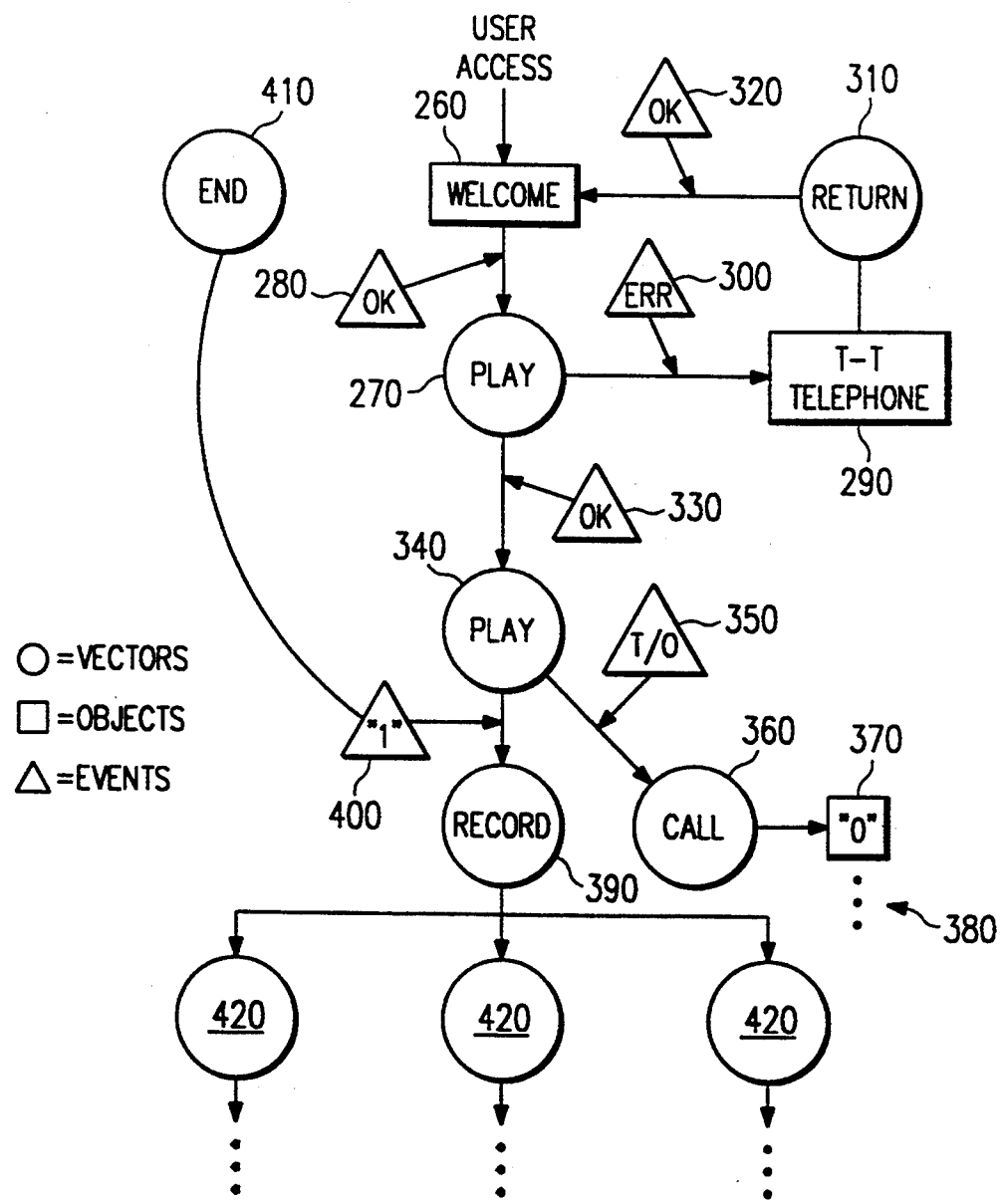
FIG. 2B is a flow diagram of an exemplary voice processing system integrating call processing, voice messaging, and interactive voice response.

Referring to FIG. 2B, an exemplary flow diagram of state vector operation in a telecommunications systems provided in accordance with the present invention is shown. The particular exemplary embodiment shown in FIG. 2B integrates a number of voice processing functions, wherein circles represent vectors, rectangles represent objects, and triangles represent particular events output by the system.

As the user accesses the system, a "welcome" object 260 is first reached which provides a welcoming recording heard by the user when the system picks up. A "play" vector 270 acts on the welcome object to change its state, thereby producing an "OK" event 280 which outputs the voice transaction found in the welcome message. However, if the user accidentally inputs a digital signal from the TOUCHTONE telephone, thereby forcing the play vector 270 to operate on the TOUCHTONE telephone object 290 for example, the TOUCHTONE telephone object in a new state produces an "error" event 300 which is output to the user. In such a situation, a "return" vector 310 is then accessed on the relational database to operate on the welcome object, thereby producing yet another OK event 320 and replaying the welcome message, this time perhaps with a warning to wait for a next output prompt.

In this example, the OK event 320 causes play vector 270 to change the state of the welcome object 260 which then further outputs another OK event 330. At this point, another vector 340 plays a message to the user. After the user hears the particular voice transaction message, the system then waits to determine whether a T/O event 350 occurs, that is, the user has not taken any action to access another vector. If T/O event 350 occurs, then yet another vector is accessed 360 which acts on the operator object "0" at 370, thereby connecting the user with a live operator to determine if there is an input problem or misunderstanding. Other events, vectors and objects could then be accessed further by the user at 380.

However, if the user does not allow a T/O event to occur and wishes to record a message in the system, a record vector 390 is accessed, producing an event, "1" at 400 indicating to the system that a message will be recorded by the user. The system then accesses an "end" vector 410 to output an ending signal to the user and to instruct the user to hang up the handset. Alternatively, other vectors are accessible by the user after recording a message, the other vectors 420 producing yet other event-based voice transactions which are recognizable to the user. The only voice processing limitations placed on the system of FIG. 2B are those found in the specifications for the particular system required by the customer.

Upon examining the exemplary voice processing system illustrated in FIG. 2B, it can be seen that even this simple system integrates many aspects of voice processing functions which were only traditionally available on discrete systems. Since play vectors 270 are available, the system behaves as a VM system. Since the basic functions required to implement VM are not unlike the functions required to implement IVR and CP, the same vectors are used for multiple purposes in preferred embodiments. On the other hand, since messages are played to the user according to the play vector 340 and may be recorded by the user according to the record vector 390, the system also integrates basic VM functions. Similarly, since the user can access event based attendants or operators at 370 according to the call vector 360, CP aspects of voice processing transactions are also available. The customer who has provided the specifications for the system of FIG. 2B has therefore attained a very versatile customized system which has eliminated the need for three discrete VM, CP, and IVR voice processing systems that would be available from separate vendors. The state vector architecture operating on system-defined events thus provides flexibility, and allows for total integration of what have previously been completely separate, unrelated voice processing tasks.

Figure 3:
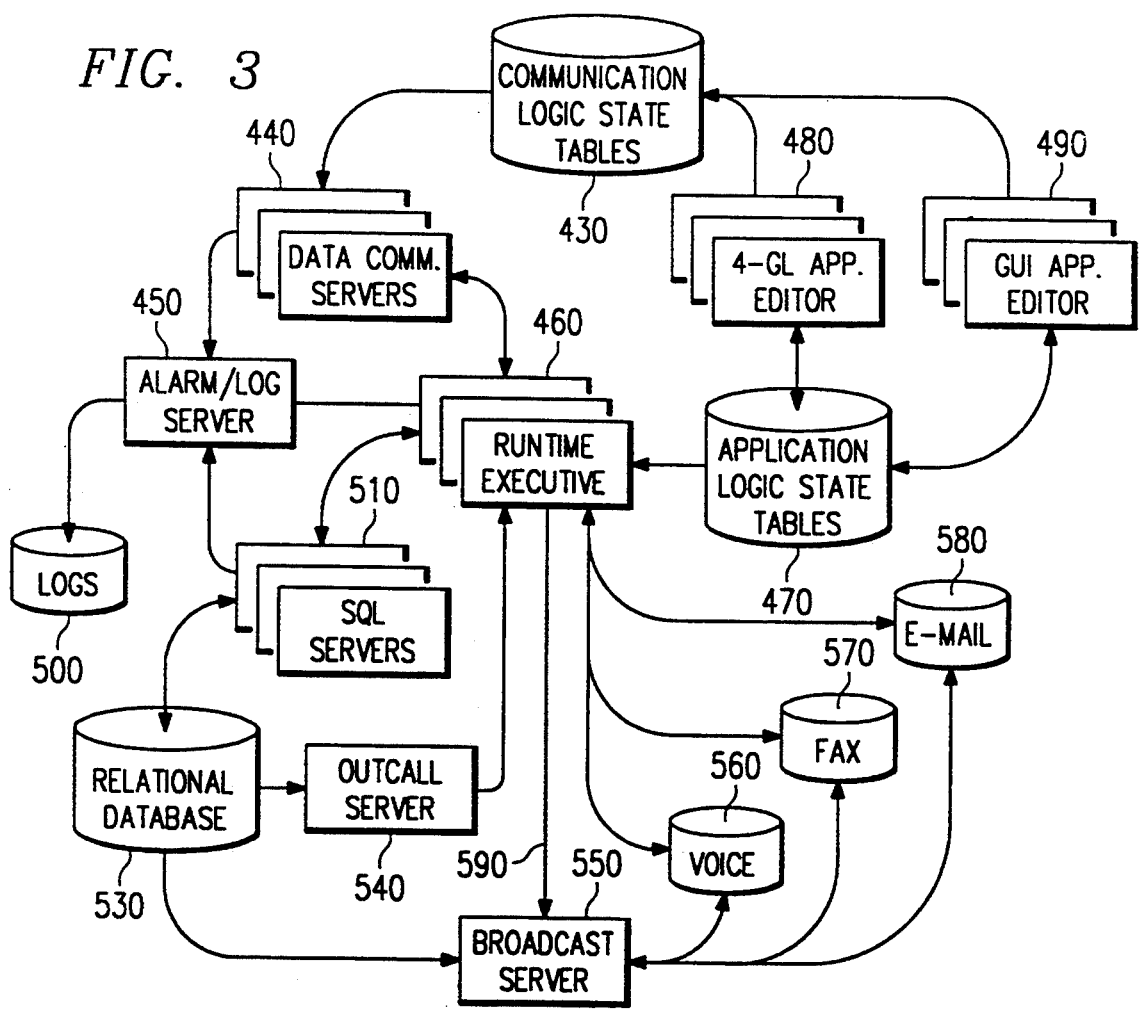
FIG. 3 is a block diagram of major processing elements found in voice processing systems in accordance with the present invention.

Referring now to FIG. 3, a more detailed block diagram of the main processing elements of integrated voice processing systems provided in accordance with a preferred embodiment of the present invention is shown. Preferably, communication logic state tables 430 are generated by the system so that processes found and generated by data communication servers 440 can perform run-time operating instructions for the system. The communication servers 440 are responsible for communication with external computers and other systems which interface with voice processing systems described herein. Yet another server 450, which is an alarm/log server, is interfaced with the data communication servers 440 to provide alarm and other type functions for the system.

The heart of the voice processing system is the run-time executive (RTX) block 460. RTX 460 in a preferred embodiment provides the main control processes for voice processing systems provided in accordance with the present invention during operation. RTX 460 is an object-oriented, run-time programmable finite state machine. The system alarm/log server 450 handles messages from all other servers in the system and logs and stores the messages. Additionally, alarm/log server 450 controls a triggering of system alarms, including audible, visible, and hard contact closures for remote sensors. In further preferred embodiments alarm/log 450 also manages the logging of system activity and usage data provided by the RTX processes. The alarms are stored in an alarm log 500 which is a data table.

The RTX preferably executes instructions which are stored and contained in an application logic state tables (AST) block 470. The application logic state tables found in AST 470 in preferred embodiments are generated by an application editor 480 (APE) which is preferably a 4GL application editor. Furthermore, application logic state tables are also generated by a GUI application editor (APEX) shown at block 490.

The APE 480 allows application developers to arrange vectors provided in accordance with the present invention to formulate the applications desired by the customer. Similarly, APEX 490 is preferably a formatted, screen interactive development program that uses a graphical interface instead of using line graphics and text-based interfaces. APE 480 and APEX 490 thus generate the communication logic state tables stored in block 430. The state tables for voice processing systems provided herein which are stored in block 430 and AST block 470 are further coordinated by APE 480 and APEX 490 to facilitate asynchronous processing of the application logic.

In a further preferred embodiment, the offloading of communications to the data communication servers 440 allows RTX 460 to issue requests and receive responses without blocking data flow. Additionally, because data communication servers 440 and RTX 460 are interactive, it is not necessary for RTX 460 to be concerned with the particular details of protocols and external computer interfaces to the system. This provides the advantageous result that the processing of the voice transactions is divided into two sets of processes, thereby resulting in inherent support for network-based processing.

Preferably also, the data communications servers 440 are driven by object-oriented application logic found in RTX 460. The SQL servers 510 function very similarly to data communications servers 440 and are responsible for front-ending relational databases, and enabling the RTX 460 to interact with relational databases using SQL statements. Thus, RTX 460 dynamically generates SQL statements during run-time to store and retrieve information to and from relational database 530 which can be considered as the system database.

The SQL processor 510 executes the SQL statements on behalf of the RTX 460 which allows RTX 460 and SQL server 510 to operate asynchronously. This further provides the advantageous operating result of a division of processing between the two separate sets of processes which promotes network-based processing in a true front end/back end, client/server processing environment.

The exchange of information between RTX 460 and SQL server 510 or alternatively between RTX 460 and data communication server 440 is preferably conducted in well-defined boundaries across individual domains. This localizes processing and reduces the flow of unnecessary data which is encountered in prior storage servers of other network-based operating systems. An outcall server 540 is responsible for generating "outcall lists." Outcall server 540 is driven by SQL statements and selects telephone numbers for outcalls. The SQL statements for the outcall server 540 are preferably entered by a human operator or alternatively, they may be generated by the RTX processor 460. In further preferred embodiments, the output of the outcall server 540 is channelled to the RTX 460 which is then responsible for placing the outcalls. The outcall server 540 may supply only limited information about each outcall to RTX 460, or it may supply detailed information. In either case, the RTX 460 may request further information from the same database that outcall server 540 used to make the selection in the first place by communicating through the SQL server 510.

The exchange of information between RTX 460 and the various servers available to the system is preferably organized by the RTX in internal storage using a concept called "voice windows." Information is exchanged between the voice windows stored on RTX 460 and its associated servers using formatted buffer exchanges over UNIX communications facilities.

A broadcast server 550 provides mail sorting and distribution for the integrated voice process systems provided in accordance with the present invention. Broadcast server 550 again preferably uses SQL statements to retrieve information from the relational database 530, thereby making sorting and distributing decisions. In preferred embodiments, broadcast server 550 sorts, collates, deposits, and broadcasts mail, including voice messages 560, facsimiles 570, and electronic mail 580, as well as other voice processing applications which are desired by the customer by its particular voice processing system as described herein. Broadcast server 550 also provides network transmits and distribution of inbound network mail. The broadcast server thus periodically cycles through pending requests and periodically looks for new requests. In addition, RTX 460 may invoke broadcast server 550 for "time special" or urgent deliveries.

RTX 460 is a finite state machine and it is dynamically programmed at run-time with instructions from AST 470. These application logic state tables are generated by either APE 480 or APEX 490 which allow application developers to specify the placement of objects, actions to be taken on the objects, and the handling or, various events that result from the specified action.

Figure 4:
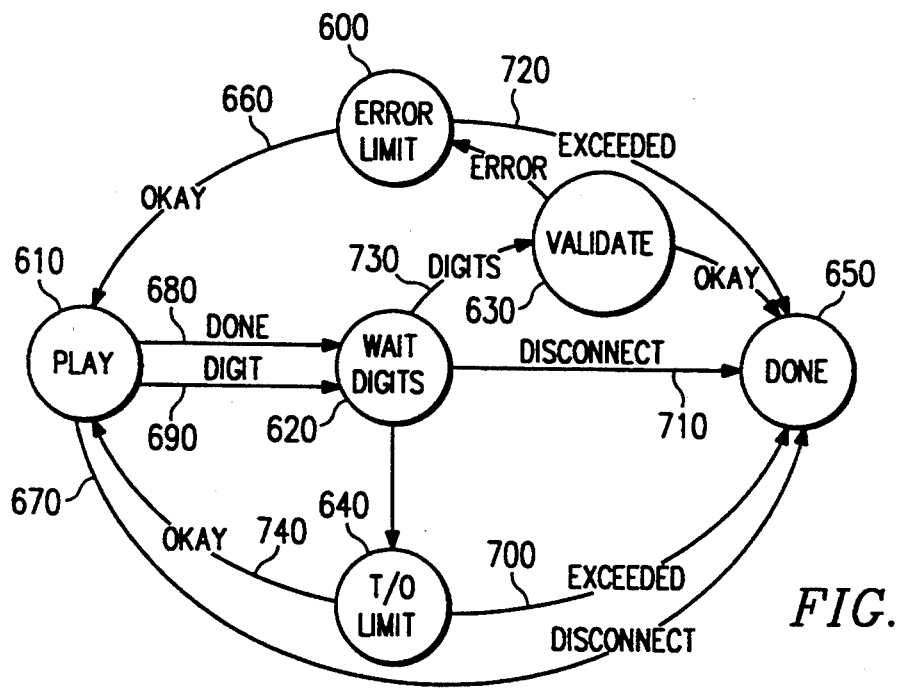
FIG. 4 is a state flow diagram of an exemplary play vector.

Referring now to FIG. 4, there is illustrated an exemplary vector which encompasses an object (in preferred embodiments a speech phrase), object states, an action, and a disposition of various events. The vector may have several states, events, and disposition of events internal to it; however, there is in general provided only one entry and exit point for the vector. The vector enters at 610 where the circles in FIG. 4 represent events such as "wait digits" 620, validation 630, T/O limit 640, and "done" where the vector exits at 650. The action of this particular vector is to play a speech phrase. Various disposition events are available such as an OK event 660, disconnect event 670, a "play done" event 680, a "digit input received" event 690, a T/O exceeded event 700, a disconnect event 710, another "error exceeded event" 720, a digit validation event 730, and yet another OK event 740. Thus, the play vector begins at 610 with an entry played so that the system waits for digits at 620, checks for digit validation at 630, or a T/O limit at 640, potentially checks for error limits at 600 or T/O limits at 640, and exits at 650 following a disconnect 670. Upon exiting at 650, the vector calling mechanism checks the exit status of the vector and consults a vector's "next-vector stack" for the dispatching of the next vector.

State Table Architecture

Figure 5A:
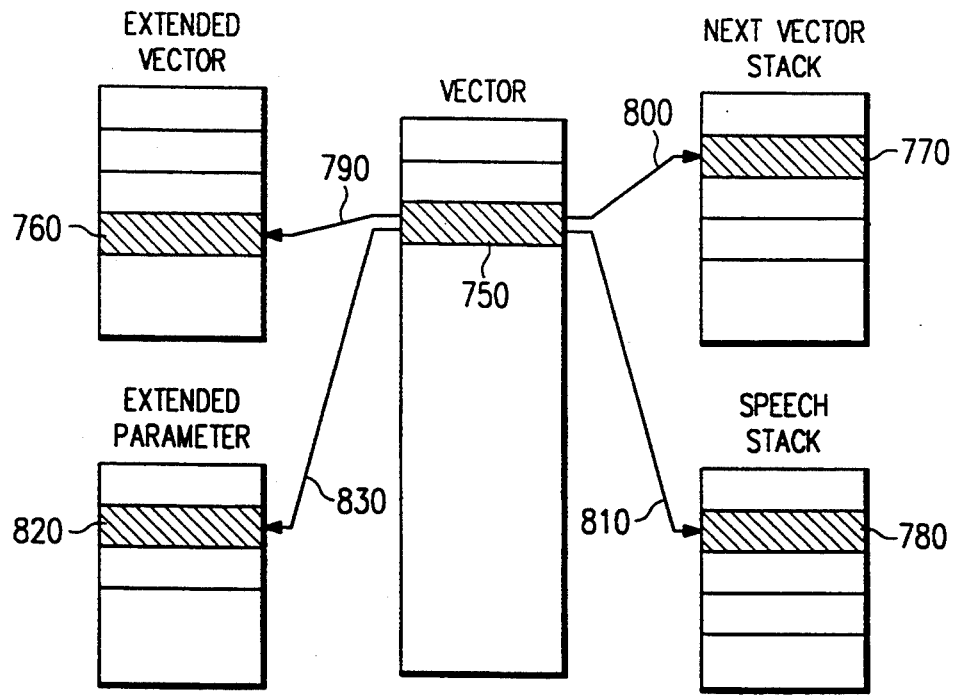
FIG. 5A is a block diagram of application logic state tables provided in accordance with the present invention.
Figure 5B:
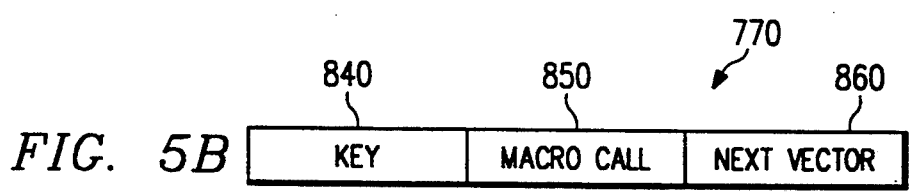
FIG. 5B is a block diagram of a compiled next-vector stack element.
Figure 5C:
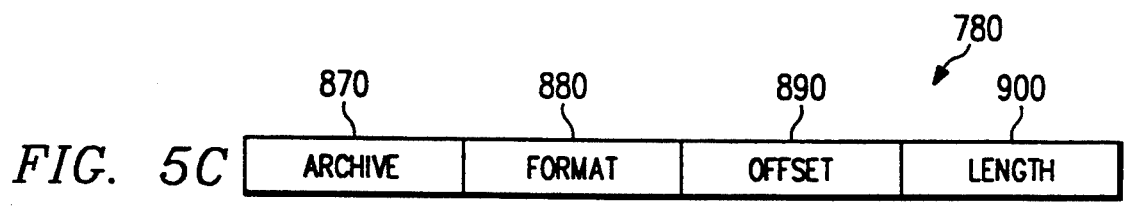
FIG. 5C is a block diagram of a compiled speech stack element.

With reference to FIGS. 5A, 5B, and 5C, the relationship of the various logic state tables that constitute the vector of FIG. 4 are shown. In the vector table of FIG. 5A, a vector 750 is the current vector that has been dispatched by the voice processing system. Associated with the vector table is an extended vector table having a vector 760 which provides "attributes" for the vector 750. The vector's attributes are the particular codes which direct the vector to perform state modification of an object as described herein. In the next-vector stack table, a next-vector stack 770 is accessed by the vector 750 to point to the next-vector available in the stack. Similarly in the speech stack, a next speech stack 780 is accessed by vector 750.

Vector 750 accesses an extended vector 760 through a reference 790 which references through the top of the extended vector stack. Similarly in the next-vector stack, the vector 750 references the next vector 770 through a reference 800 to the top of the next-vector stack. Speech associated with the vector is referenced through 810 on the speech stack. Reference 810 references through the top of the speech stack elements.

SQL statements associated with the vector are referenced through a reference 830 into an extended parameter stack table to a specified entry 820 within the table. The vector 750 comprises codes which tell the system, for example, which extended vector to use, which extended parameter is next, which vector is next in the stack, and which speech element is next in the stack. A plurality of vectors so described having the elements 750 through 830 are stored in the AST 470 as a set of logic state tables.

FIG. 5B shows the compiled next-vector stack element in an exemplary embodiment. The next-vector stack element may comprise a "key" field 840 which points the vector to the next event available in the system. The next event shown in this exemplary embodiment is a "macro call" in field 850 which tells the vector to call and search for the next vector stored in field 860. In a similar fashion, a compiled speech stack element shown in FIG. 5C comprises for example, an archive field 870 which tells the vector where to go in a database to retrieve a speech element, according to a particular format in a format field 880. An offset field 890 holds a code to tell the vector at what point in the archive to retrieve the speech, and a length field 900 tells the vector the particular length of the particular speech element which will be retrieved.

Voice Window Architecture

Figure 6:
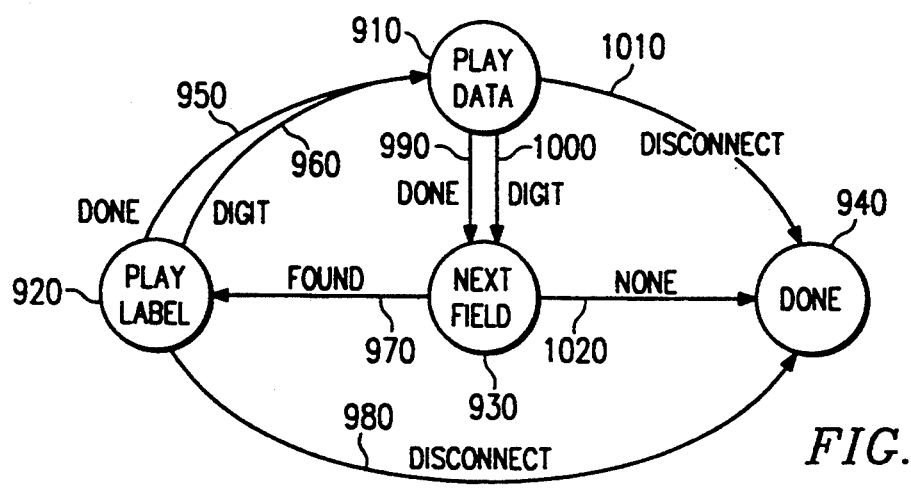
FIG. 6 is a state flow diagram of a voice window play vector provided in accordance with the present invention.

As discussed above, in preferred embodiments the exchange of information between RTX 460 and the data communications server 440, the SQL server 510, and outcall server 540 is organized using voice windows provided in accordance with the present invention. Referring to FIG. 6, there is shown an exemplary voice window protocol organized to manage the information exchange between the processes heretofore mentioned, in between the particular voice transactions and uses of the system. In the exemplary embodiment of FIG. 6, the state transitions within the voice window vector for an output or protected field are illustrated. The voice window structure of elements plays data at 910 and begins with a play label 920 that acts as the entry point for the vector. Similarly to the play vector shown in FIG. 4, the vector shown in FIG. 6 has an object which in this case is the voice window field, has several states such as the "play data" state 910, "play a label" state 920, the "next field" state 930, and a "done" state 940, which is the exit. The vector of FIG. 6 plays the voice window field, and contains a disposition of various events, for example, event 950 which is "play done," event 960 which is "digit received," event 970 which is "field found," event 980 which is "disconnect," event 990 which is "done play data," event 1000 which is "digit," event 1010 which is another "disconnect," and event 1020 which is "no next field."

Upon entry at play label 920, the vector executes the first field in the voice window and continues execution through the entire set of voice window fields, unless prematurely interrupted by a terminating event. Using this vector, an application dispenses information to the caller one information field at a time. On entry at play label 920, the vector preferably plays the field label associated with the first field, and either plays to completion and leaves the play label state through event 950 play done, encounters a caller input event 960, or gets a disconnect signal from a telephone switch at disconnect event 980. If either done event 950 or digit event 960 are encountered, the state preferably transitions to state 910 play data, and the system commences playback of the data contained within the voice window field.

Play data state 910 is terminated by play done event 990, digits received event 1000, or disconnect event 1010. In the case when done event 990 or digit received event 1000 is encountered, the program then dispatches the next field state 930 which causes the program to bump the field pointer to the next voice window field available in the vector.

If next field state 930 is able to bump the field pointer, the cycle starts over with found event 970 and transitions to play label state 920, otherwise the vector is prepared for exit through the done event 1020 and the done state 940. In cases where the program is interacting to one of its states through the telecommunication channel, a disconnect signal from the telephone switch that is connected to the telephone channel will cause immediate exit of the vector through done state 940. Upon exit, from this vector, the vector calling mechanism checks the exit status of the vector and dispatches the appropriate vector based upon the entries and the returning vector's particular specified next-vector stack. This is identical to the return to post exist processing of the play vector exit through 650 as discussed in reference to FIG. 4.

State Transitions

To better understand the voice window state transitions extant in FIG. 6, FIG. 7 illustrates the allowed voice window state transitions. When executing an input allowed field, the vector entry point at 1040 is a "play label" state. The vector steps through all the voice window fields, plays the voice field label through play label state 1040, and if a "digit input" is received from the caller at digit event 1130, the next state dispatched will be "get digit" state 1030, which gets the digits and waits for the number of digits expected. If all the digits are received in time, a "digit" event at 1160 causes dispatch to the next state to the "populate" state 1070 which populates the voice window field with the digits. The populated event 1070 then returns and the next field state 1080 which bumps the field pointer to the next voice window field after the done state is reached through a "none" event 1170 signifying that no next field is available. If "next field" state 1080 finds another field in the voice window, then the cycle starts over with the new field through "next field" event 1110 to the play label state 1040. However, if a T/O event 1150 takes place after the "get digit" state 1030 occurs, then time out event 1150 dispatches the "T/O limit" state 1050 which checks for the number of time outs that have taken place so far, and either causes an "OK" event 1090 to dispatch the play label state 1140, or causes the exceeded event 1040 to dispatch the done state 1060.

The combination of vectors in FIGS. 6 and 7 can be used to create a "super-vector" which handles both output or protected fields similar to the play vector shown in FIG. 4, in preferred embodiments. This super-vector may then be deployed to handle the exchange of information between the system processes and voice transaction events to the users. Using the super-vector on voice window fields, the caller and the system programs are able to exchange information with a mixture of both protected and unprotected voice window fields.

Refinements and enhancements may be added to the vectors illustrated in FIGS. 4, 6 and 7. For example, information validation prior to population of the voice window field at population state 1070, verifying the data input to ensure that direct information is entered by the caller, reentry of a date, opportunity to accept partial input which is used when the program is able to narrow down from the partial input when a caller is attempting to offer appropriate help, and others are all potentially addable to the system. Additionally, voice programs may be used to build program/caller interfaces, which are interfaces used to exchange information between clients and the servers 440 and 510. For example, RTX 460 may request SQL server 510 to reply with the results of an operation and any information retrieved form the relational database 530. As part of this request from RTX 460 to SQL server 510, RTX 460 attaches a reference to one of its voice windows which receives the results of the database operation. When SQL 510 completes processing of the request, it responds back to RTX 460 using the reply to address contained in the original request. Upon receiving of a response, RTX 460 reloads the voice window reference and populates the window with information contained in the response packet. In this fashion, voice windows provided in accordance with the present invention are used to exchange information between users and the user interface program, and between user interface,programs and relational databases.

Thus, the use of voice windows along with the creation of SQL statements from voice windows provides an extremely powerful and flexible method of facilitating user interfacing to relational database through SQL statements. The cooperation between RTX 460 and SQL 510 may also be extended in accordance with this invention, to cooperative processing between RTX 460 and the data communication servers 440. In this embodiment, data communication server 440 perform server functions by interacting with an external computer directly using SQL statements, wherein the external computer is in an environment which is foreign to the integrated voice processing system. For example, data communications server 440 may be a terminal emulation program using IBM 3270, Unisys Poll/Select, or UNISCOPE with Unisys terminal emulation, IBM 5250 terminal emulation, digital VT 100 terminal emulation, IBM LU6.2 peer-to-peer communications, or any other variety of communications protocols. Further in the case of the LU6.2 pair-to-pair protocol, the peer process on the foreign host external computer may also be an SQL server acting on an SQL front-ended database residing on the foreign machine.

Vector State Logic

While the data communication server 440 is custom designed for any type of communications protocol, the communication logic state tables 430 contain the vectors which define the "personality" of the data communication server in each customer application. Thus, as with the RTX 460 assuming multiple personalities based upon the arrangement of vectors in the application logic state tables 470, a single IBM 3270 server program in preferred embodiments serves multitudes of applications based upon the arrangements of the vectors in the logic state tables. By using vectors and windows with dynamic SQL statements, the flexibility inherent in creating powerful interfaces between the users and the computers in a myriad of applications is multiplied. The interface so created is not limited merely to users communicating with computers, but could also be used to communicate between two computers in a voice processing system, wherein one of the computers emulates a user. The use of this kind of computer to computer interface is especially adaptable to customer specification requiring stress testing or benchmarking systems applications.

Voice Window State Logic

Voice windows can be viewed as collections of related voice fields, in a manner similar to a display in graphical window systems which are collection of display fields on display terminals. Each of the voice fields has particular characteristics and attributes, and an application developer can define a voice window in accordance with the present invention similar to defining the layout of a display screen in a display window system. Once a voice window is so defined, it is then referred to by vectors as objects to operate on. Each voice window will then have at least one voice field and a name indicating the ownership of the field by a specific voice window.

Referring to FIG. 8, a voice window schema is illustrated wherein each voice window has a name in a window name field 1190. The field name 1200 identifies the field within a window wherein window name 1190 and field name 1200 together represent a unique, fully qualified name for the voice window. This combination is used to reference the field throughout the application logic state tables 470. Label 1205 defines a field type in the voice window and label 1210 delineates the input size which preferably is a number of digits that are solicited for input from a caller. Label 1220 contains the voice label for the particular field which is much like the title or a heading for the information displayed on the display terminals in a window graphics system. Voice label 1220 is further preferably played by the vector window before either the data contents are played, or an input is solicited. The cross window name 1230 contains the name of the voice window that is used to resolve the window type by referencing to a cross window which is simply a window which works in tandem with the present voice window to accomplish a voice transaction. Cross field name 1240 contains the name of the field for resolution of the cross field reference as described above. Validation function 1250 contains the name of the optional user written, C-language function that may be called upon for data validation or transformation. Validation functions in preferred embodiments are bound at run-time and need not be bound together at link time to the RTX run-time executive.

A conversion format 1260 is used to perform transformation of data while populating the field in the case of unprotected fields and announces the field contents on protected fields. An enunciation type 1270 preferably defines the form of enunciation to be used for playing data from a field. Input delimiters 1280 provide a list of digits that will signal an end of the input from the caller whenever any one of the digits is encountered. Finally, field attributes 1290 modify the program behavior of the vector executing the field with a further combination of attributes. In the case of window field types 1205, window enunciation types 1270, and window field attributes 1290, various possible values for each of these elements are possible. Referring to FIG. 9A, voice window types such as a character 1300, a filler 1310, or a simple time stamp 1320 are possible window field types. In the case of a unique file name 1330, a particular data file type that causes the field to be populated by a string of characters representing a file name that is guaranteed to be unique across the entire system is specified. This particular file name may be used to deposit various forms of messages for recipients. It may then be used without modification for broadcast to other recipients within the same system or the network without the possibility of file name collisions.

A "constant" field type 1350 identifies a constant within the voice window to be applied to the vector transformation. The voice window field type "reference" 1360 indicates that the field contains no data and that all attributes and characteristics are to be applied to data residing in another field either within the same voice window or across another window. The "copy" voice window field type 1370 preferably states that this field is to be populated with data from another field, either from within the same window or across another window. The "sequence" voice window field type 1380 causes the contents of this particular field to be incremented each time this window is executed.

Referring to FIG. 9B, the enunciation types available to this particular voice window scheme are illustrated. The enunciation type "date" 1390, "money" 1400, "numeric" 1410, and "paired numeric" 1420 provides these particular enunciations to the voice window and are common voice processing functions. Enunciation type phrase 1430 is used when certain data are necessary as a key to locate a prerecorded voice "phrase" to be played to the caller instead of the data itself. The enunciation type "time" 1440 is populated from a C-language formatted time function call to play the time to the caller. Finally, the enunciation types "percent" 1450 and "none" 1460 provide these particular self-explanatory enunciations to the voice window for play to the caller.

Referring to FIG. 9C, attributes which modify the program behavior of the vector executing the field with a combination of attributes are shown. The "verify" attribute 1480 causes the field input to be solicited twice and compared before populating the field. "Partial input" attribute 1490 allows partial input of data to be accepted into the field, which facilitates the program to make an educated guess at what the caller is trying to accomplish if and when the caller is having difficulty using the system. The "continue on error" attribute 1500 disregards errors caused by the input or output of the field data with a resulting premature interruption or execution of the voice window by the executing vector. Finally, the field attribute "non-volatile" 1450 holds the system in a non-volatile state when certain input is received from the user requiring particular wait times.

The detailed structure of compiled vector elements as they exist on the application logic state tables is illustrated in FIG. 10. The vector name segment 1520 identifies the vector and the vector type segment 1530 defines the action that the vector performs on the objects that it operates on. A "sub-type" segment 1540 further defines the action that the vector performs when yet more complicated actions are required. A "parameter" segment 1550 contains information that is interpreted by the vector based upon the type 1530 and sub-type 1540. In preferred, embodiments, whenever information in a parameter 1550 is used by a vector, that information becomes the object of the vector. The parameter 1550 contains any one of several parameters, including for example, voice window names, voice field names, phone numbers, dates, times call durations and other particular parameters defined by the particular vector in use.

In preferred embodiments, any time a value is specified as a parameter to a vector in parameter 1550, the value itself may be substituted for by a voice field name which creates a dynamic object passing mechanism that is resolved at run-time based upon information contained in the voice windows. This type of parameter information may come from the caller, from the relational database, from an external computer, or it may be a combination of all of these sources. Because of the flexibility of parameters 1550, the dynamic run-time modification of the execution logic in accordance with this invention is maximized.

An extended parameter segment 1560 contains the skeleton of the SQL statement which is used to create dynamic SQL statements using information from the voice windows. A next-vector stack segment 1580 preferably contains a plurality of next-vector dispatching instructions which are matched up against vector exit conditions. Similarly, the speech stack 1590 contains a plurality of speech references into the speech archives. These particular speech references are used to locate speech fragments to play to the caller when particular vectors call for the playback of speech on demand.

Referring to FIG. 11, an illustration of the structure of the application logic state tables is shown. A compiler version and time stamp 1600 ensures that the APE 480 and APEX 490 mark the state table so that a compatible version of RTX 460 is user to execute the application logic. A compiled channel descriptor 1610 contains information about the various telephone channels that will be serviced by the voice processing system. General information about the type of channel and its signalling characteristics are maintained in the compiled channel descriptor segment. Similarly, speech archive descriptor 1620 contains information about the particular speech segments that are used by the system.

An input/output (I/O) translation table 1630 holds an index for locating speech phrases based on data contained on voice window fields if called for by the phrase enunciation 1430, which is also used to translate input into window fields. Using input translation, caller inputs may be located in the index and substituted with the contents of a translation entry whose key matches the caller input. To avoid collisions with data in a voice window which is the same as data in another voice window but applied differently, the conversion format 1260 is applied to the data before performing look-up in the I/O translation 1630.

The plurality of vectors segment 1640 contains the compiled vectors, and the plurality of voice window segments 1650 preferably contains a plurality of voice windows. Voice windows thus appear in window fields consecutively stacked together from the first field to the last field. Each window is referenced by a window header which preferably contains information about the size and data area required to hold the field contents of the window. Windows are preferably read from a plurality of voice window segments 1650 dynamically created and destroyed in the main memory of the vector executing program at run-time. When the particular caller terminates the call, all the windows are destroyed in the main memory and the data area which has been reserved for the windows is preferably released. However, some window fields may be marked "non-volatile" by the field attribute 1510 and these windows are then used to maintain information between calls, thereby serving as a parameter passing mechanism between particular calls. This allows the system to behave in a dynamic fashion transferring data from caller to caller in preferred embodiments.

SQL Statement Creation

It is generally desired to created dynamic SQL statements from voice windows as described above. Referring to FIG. 12, a flow chart for transformation of SQL statements at run-time to executable statements from data in voice windows is illustrated. A dynamic program searches for a token at 1660 which are SQL components used a building blocks for SQL statements. If all the tokens have ended at 1680, there is a normal exit from the program at 1670. Otherwise, the token is written to the window field at 1690. If there is not a token in the window field at 1690, then the token is written at 1700 and the next token is accessed at 1660. Otherwise, at step 1720 it is determined whether the window is indeed active with a present token. If not, then the method defaults to 1710 with an error and the program is exited. If default does not occur, data is written at 1730 in a field and the method returns to 1660 for the fetching of the next token. In this manner, the SQL statements are transformed at run-time into executable statements in the voice window architecture.

Message Envelope in a VM System

With voice processing systems provided in accordance with the present invention, the main object of the manipulation of data by vectors is accomplished in integration of IVR, VM, facsimile, electronic mail (E-mail), CP, and other types of voice processing functions. A "message envelope" is created to provide integration as is illustrated in FIG. 13A. At block 1740, a "magic number" which identifies a particular file as a message envelope and the version of the program that created the envelope for backward compatibility is accessed. A segment count 1750 contains a count of message segments within the envelope, each envelope containing at least one segment. However, the envelope may contain several other segments of the same media type, or it may contain a mixture of voice, FAX, E-mail, or other data. Multiple segments of voice processing functions are used to keep a voice message intact while it is being forwarded from one mailbox to another with an adaptation from each mailbox owner. Additionally, multiple segments are used when a FAX or an E-mail message is sent or forwarded to another mailbox owner. In this fashion, multiple media message formats are contained within a single envelope.

A segment size block 1760 contains the size of the segment, while a sender identification (ID) block 1770 provides an identification of the sender of the message in the segment. If the sender ID is not known, this field will contain a zero for telephone calls from-the outside where the caller ID is not available. The time sent block 1780 preferably contains the time when the message was created. Message attributes 1790 contain a combination of attributes for the various messages. Message format 1800 indicates the format of the message which is contained in a contents segment at block 1810. This format specification includes media and data compression indicators. The content segment 1810 is preferably used by the RTX 460 to determine the medium and type of delivery mechanism to be used to deliver the contents of the content segment 1810 to the recipient. The message envelope is repeated at 1820 for the particular segment size IDs, times sent, etc., while the magic number and segment count are kept constant at 1830.

Referring to FIG. 13B, the particular available message segment attributes 1790 are illustrated in this exemplary embodiment. A "notify on delivery" attribute 1840 is set by the RTX 460 to request a subsequent session of the RTX to notify the sender on delivery of the message. A "message purge" process provided by this particular message envelope periodically purges messages that exceed a predetermined storage retention time allocated for each type of message. The purge process also informs the broadcast server if it has purged a message that should have been purged based on age, but before it could be picked up by the recipient.

A "reply allowed" attribute 1850 allows the recipient to reply to a message when sent. When the "reply allowed" attribute 1850 is set to zero, it indicates that a mail box owner who sent a general broadcast message does not wish to receive a multitude of replies in response to the general broadcast with a large distribution list. The sender of the general broadcast in preferred embodiments thus has the option of setting the reply allowed attribute to zero. A "private message attribute" 1860 disables the forwarding of a message past the recipient, and an "urgent" attribute 1870 marks the message as urgent and ensures that messages so marked are presented to the recipient before any other messages are presented.

It will be recognized that several types of vectors may be used to manipulate the envelopes and messages as described above. These include, but are not limited to, vectors to create, append, forward, save, purge, pick up, reply, broadcast, and vectors which provide other actions which are particularly used to manipulate mailboxes, envelopes, and other messages. Since the arrangement of vectors to manipulate "the envelopes and messages are dynamically programmable by APE 480 and APEX 490 into AST 470, the entire personality of an integrated voice processing system provided in accordance with the present inventions is fully configurable and changeable. Thus, a voice processing system so described may be designed to emulate any existing menu structure, or a completely new menu structure for a system particularly defined.

In addition to the vector manipulation of envelopes and messages, RTX 460 preferably reads information into an out-of-message envelope using voice windows as described herein. In order for a caller to receive a message, a first vector preferably opens the envelope, and a second vector reads information from a message envelope into a voice window. The information in the voice window is then available for processing by all other vectors that are used to develop voice processing applications. Envelopes and messages may also be created using windows to collect information from the caller, or the data communication server 440 and SQL server 510. Voice processing systems provided in accordance with the present invention simply convert voice messaging into an interactive voice response application with the use of a message envelope as an object that is manipulated by vectors wherein the information contained in the envelope and the message are available to all other vectors as the information is obtained from, or bussed to, the data communications server 440 or SQL server 510. In accordance with the present invention, the vectors themselves need not be concerned with the details of the particular VM, facsimile, E-mail, or other voice processing function, but provide a structure for accomplishment of these functions and the relationship between there functions which are stored on a relational database or other system.

Integration of Voice Transaction Vectors

In the case of a collection of vectors which implements voice mail, this set of vectors may be integrated in the same application logic state table with a set of vectors that implements other database or external computer based transaction processes using the data communications server 440 or the SQL server 510. In this fashion, several sets of vectors may be preferably combined to form a tightly integrated, multiple application voice processing system providing efficient interfaces. Examples of these applications include a sophisticated call director, a VM system, an IVR system, a facsimile store forward server, and an E-mail server.

Additionally in preferred embodiments, groups of vectors defining various applications may be bound together in a single application logic state table 470 and a single communication logic state table 430. Alternatively, they may be separated over several communication logic state tables and application logic state tables. The separate logic state tables may then be treated as object by a vector from within the logic table that is executable, and operates upon a named logic table external to itself. This further permits creation of a library of vectors that is reusable across diverse sets of customers. Since all these applications are under the control of the same RTX 460 and communication logic state tables 430 and application logic state tables 470, information may be freely exchanged between the various applications.

Thus in accordance with voice processing systems described by this invention, a caller may now request information about an account, listen to this information, request a facsimile copy sent to a particular FAX machine, and leave a message for its account representative without ever leaving the system. In addition, the message sent to the account representative takes advantage of the fact that the caller's account record located on a mainframe using the data communications server 440 contains the identification of the account representative and thus, the caller is never asked to identify the representative nor is the message ever deposited in a general mailbox for manual resorting and redirection. The message also now contains a customer identification, a summary of the caller's account status at the time the message was created, and identifies the fact that the caller requested a facsimile copy of the account information.

Should the representative wish to leave a message for the caller, the customer account information is retrieved into a window, and the "create a mailbox" vector is called to create an on-demand mailbox for the customer if one does not exist so that the message is then deposited into an envelope in a mailbox. The on-demand mailbox is then treated as a regular mailbox until it is aged and purged from the system. On the next call, the caller will then be informed of the waiting message and given an option to be forced to pick up the message before being given any other information.

Thus, it can be seen that a multitude of options and possibilities are opened up by the integration of voice mail, facsimile, and E-mail, with interactive voice response functions using vectors, voice windows, and SQL processing provided in accordance with the present invention and described by this exemplary embodiment. The personality of the voice processing system so described is entirely dependent upon an arrangement which forces the callers to clear their mailboxes before being given further information about their accounts. Other arrangements could, for example, simply inform the callers of the waiting messages, while other examples would require the callers to make a specific selection to check if they have any messages. An endless combination of vectors is therefore possible, and an endless number of applications of seamless integration is provided in accordance with the present invention. Such results have not heretofore been achieved in the art and satisfy a long-felt need for integration of voice processing functions.

There have thus been described certain preferred embodiments of voice processing telecommunications systems provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. A voice processing system capable of being customized by an application developer for providing voice transactions through a telecommunications line, comprising:

a computer operable to communicate through the telecommunications line with an outside environment;

an application editor operable to separately arrange vectors, objects, and events in an application state logic table, in response to input from the application developer, a vector, at least one object, and at least one event collectively representing a voice transaction;

a memory for storage of the application state logic table; and an executive associated with the computer and operable to access the memory and execute the vectors to provide the voice transactions.

2. The voice processing system of claim 1, wherein the application editor comprises a graphical interface that allows manipulation of graphical representations of the vectors, objects, and events to construct a graphical representation of the voice transactions.

3. A method for providing voice transactions through a telecommunications line, comprising the steps of:

separately arranging vectors, objects, and events in an application state logic table, a vector, at least one object, and at least one event collectively representing a voice transaction;

storing the application state logic table; and executing the vectors on a computer to provide the voice transactions through the telecommunications line.

4. The method of claim 3, and wherein the step of arranging comprises manipulating graphical representations of the vectors, objects, and events to construct a graphical representation of the voice transactions.

* * * * *